United States Patent [19]
Derner

[11] 3,869,131
[45] Mar. 4, 1975

[54] MULTIPLE SEAL CARRIER
[75] Inventor: William J. Derner, Indianapolis, Ind.
[73] Assignee: FMC Corporation, San Jose, Calif.
[22] Filed: June 20, 1973
[21] Appl. No.: 371,923

[52] U.S. Cl............... 277/21, 277/59, 277/71, 308/187.1
[51] Int. Cl........... F16j 15/36, F16j 15/34
[58] Field of Search.................. 308/187.1; 277/17–21, 3, 15, 16, 59, 70–79, 24

[56] References Cited
UNITED STATES PATENTS

| | | | |
|---|---|---|---|
| 2,827,344 | 3/1958 | Maag | 308/187.1 |
| 3,113,810 | 12/1963 | Brusca | 308/187.1 |
| 3,330,563 | 7/1967 | De Puydt et al. | 308/187.1 |
| 3,788,610 | 1/1974 | Buelow | 308/187.1 |

Primary Examiner—Richard E. Aegerter
Assistant Examiner—Robert I. Smith
Attorney, Agent, or Firm—J. F. Verhoeven; C. E. Tripp

[57] ABSTRACT

A seal carrier, which receives a rotatable shaft therethrough, has two spaced apart seals mounted therein. A first annular grease chamber around the shaft is defined between the two seals, and a second annular grease chamber around the shaft is defined between one of the seals and a circular flange of the carrier which is spaced from said one seal. The carrier has a grease inlet fitting in communication with both grease chambers, and has a discharge opening diametrically opposite the inlet fitting. The circular flange is closely spaced to the shaft and defines a small, annular discharge opening therewith. Grease introduced under pressure through the inlet fitting is distributed all around the annular grease chambers, with excess grease being discharged from said discharge openings.

11 Claims, 8 Drawing Figures

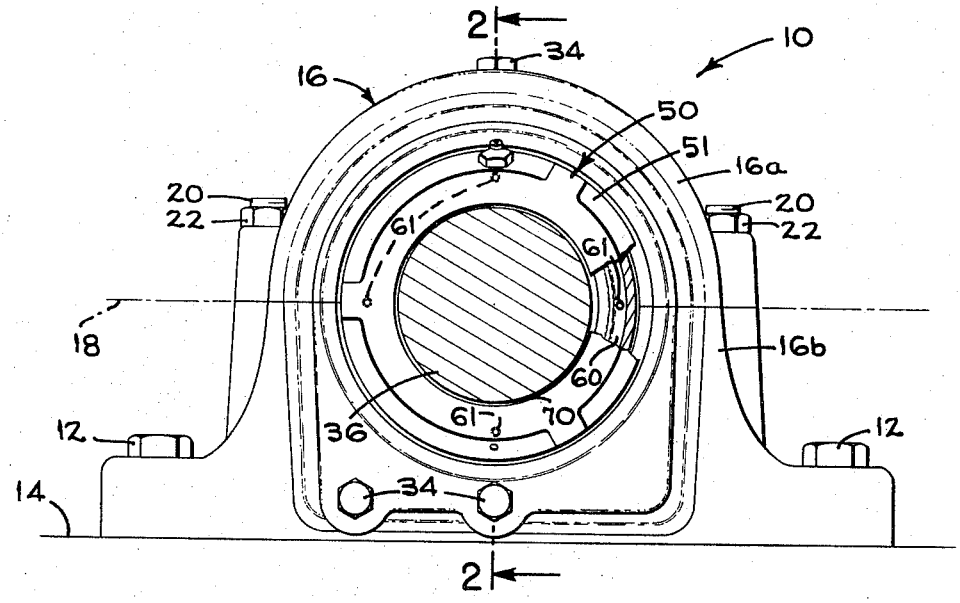
FIG_1
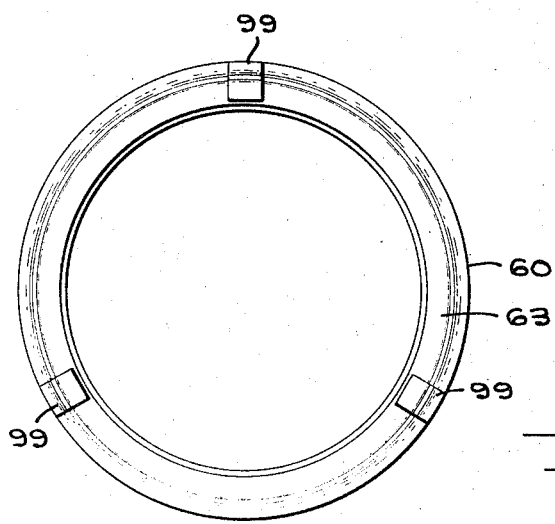
FIG_8

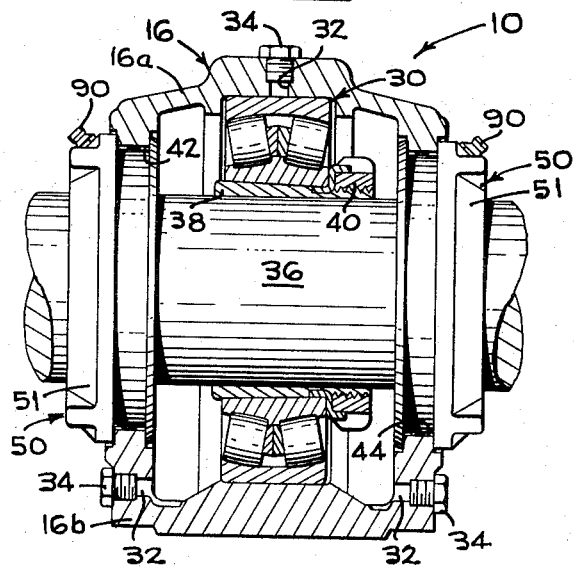
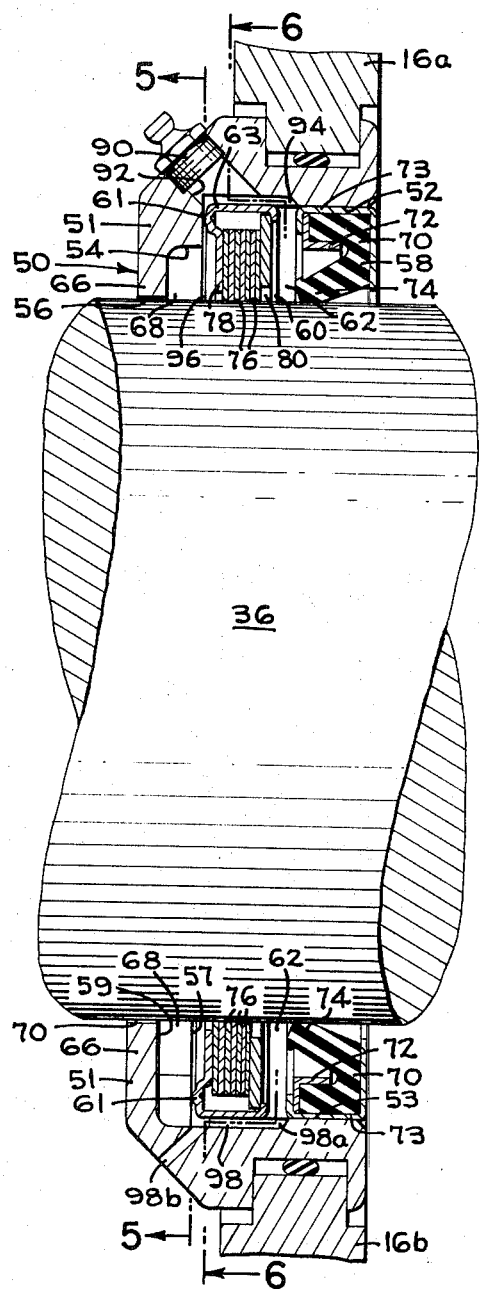
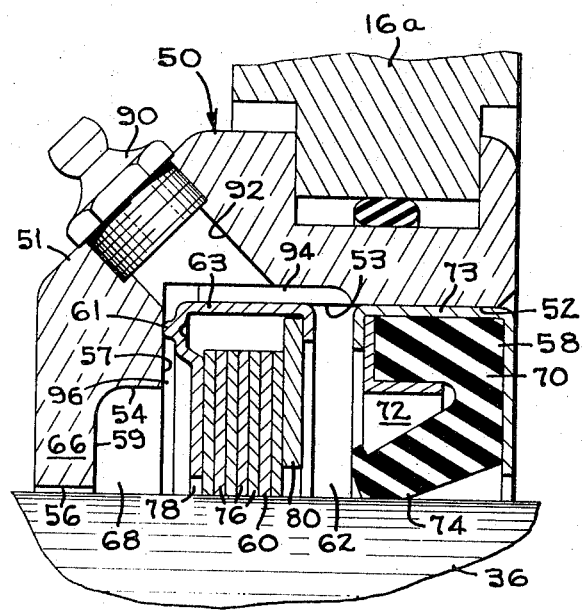

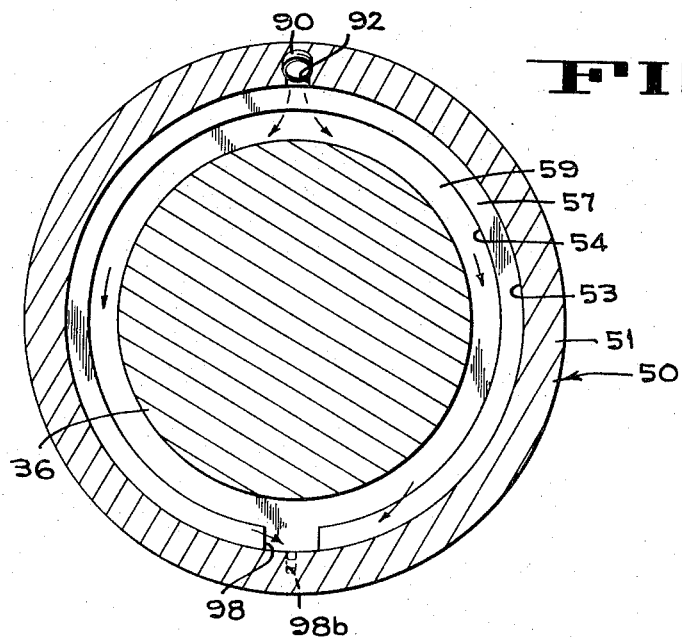
FIG_5
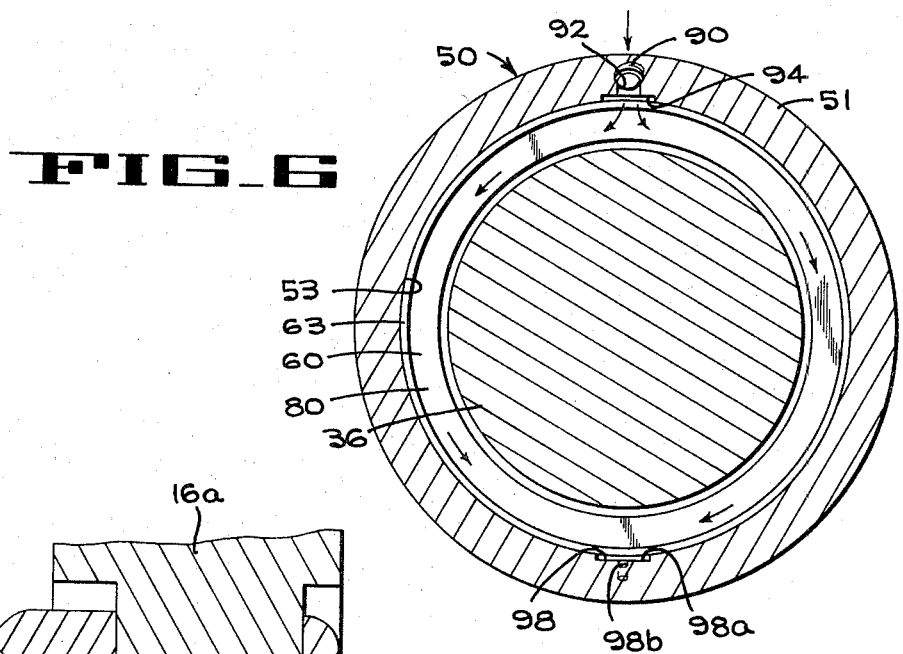
FIG_6
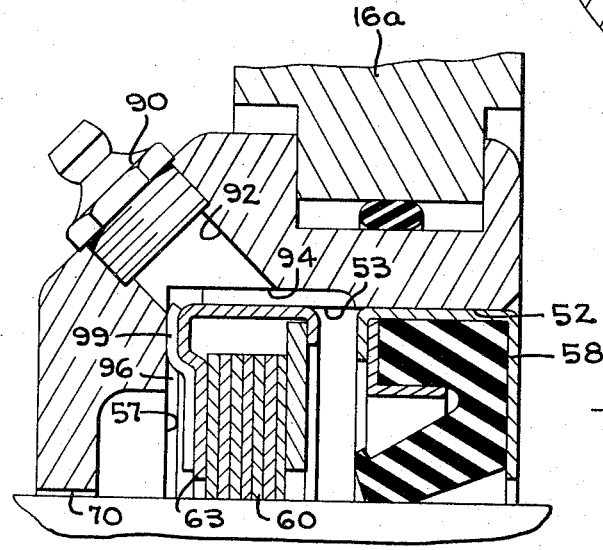
FIG_7

MULTIPLE SEAL CARRIER

BACKGROUND OF THE INVENTION

When a shaft is supported by a bearing, it is common to support the bearing in a housing, such as a pillow block housing, and provide seals which surround the shaft at each end of the housing to block dirt and grit from entering the housing and reaching the bearing. It is known to mount the seals in a seal carrier, or ring, which is secured in the housing.

In such an installation it is desirable to lubricate the seals to prevent excessive wear of the seals by contact with the shaft. It is also desirable to purge from the carrier any dirt or grit which may penetrate the carrier.

SUMMARY OF THE INVENTION

A seal unit is provided in the present invention which not only successfully prevents contaminates from reaching the bearing, but also permits complete lubrication of the seals and effective purging of any dirt or abrasives from the carrier. In brief, at least two spaced apart seals are mounted in the carrier. A first annular grease chamber is provided between the seals and a second annular grease chamber is provided between the outer, or end seal and the end wall of the carrier. A grease fitting inlet is mounted in the carrier in communication with both chambers. The first chamber has a restricted discharge hole and the second chamber has an annular discharge gap between the shaft and the end wall of the carrier. The restriction to grease flow created by the discharge openings of each chamber is greater than any restriction to flow into the chambers so that, in each chamber, the grease will fill the annular chamber before discharge through the discharge opening. Thus, although each discharge opening prevents blow-out of the seals, each chamber will fill with grease under pressure.

The grease under pressure which surrounds the shaft in the chamber between the seals will penetrate the seals and provide a complete and thorough lubrication of the seals. The grease under pressure which surrounds the shaft in the chamber between the front seal and the front wall of the carrier will discharge through the gap between the shaft and the end wall of the carrier to purge dirt and grit from the carrier.

It is therefore one object of the present invention to provide a seal which will effectively block dirt from entering shaft bearings.

It is another object of the present invention to provide a seal carrier which can be purged of dirt.

It is yet another object of the present invention to provide a seal carrier in which dirt can be purged and the seals lubricated at the same time.

BRIEF DESCRIPTION OF THE DRAWINGS

FIG. 1 is a front view in elevation of a pillow block having seal units constructed in accordance with the present invention.

FIG. 2 is a view taken on the line 2—2 of FIG. 1.

FIG. 3 is an enlarged view, taken as the view of FIG. 2, of the seal unit.

FIG. 4 is a fragmentary view further enlarged to show with more clarity the seals of the seal unit.

FIG. 5 is a view, reduced in scale, taken on the line 5—5 of FIG. 3.

FIG. 6 is a view taken on the line 6—6 of FIG. 3.

FIG. 7 is a view similar to FIG. 4 showing a modified outer seal.

FIG. 8 is a front elevation view of the modified front seal of FIG. 7.

DESCRIPTION OF THE PREFERRED EMBODIMENT

There is shown in FIG. 1, a pillow block 10 which is mounted in a conventional manner by means of screws 12 to a support surface 14. The pillow block has a housing 16 which is split on a horizontal plane 18 into an upper housing portion 16a and a lower housing portion 16b. In use, the pillow block housing portions are secured together by studs 20 and nuts 22.

As shown best in FIG. 2, a bearing 30, which may be a conventional spherical roller bearing, is mounted in the housing. Openings 32 in the housing to receive and pass lubrication for the bearing are sealed by plugs 34. A shaft 36 is received in the bearing and is secured thereto by means of a mounting sleeve 38 and nut 40. The shaft extends through circular openings 42 and 44 at each end of housing 16.

A seal carrier, or ring, 50 is mounted in the housing in each of the openings 42, 44 to keep the bearing lubricant inside the housing and to prevent entry of dirt or other abrasive material into the housing. The carrier 50 has a housing 51 of circular conformation. Housing 51 has a bore 53 (FIG. 4) extending therethrough which consists of a first bore portion 52, a second bore portion 54, and a third bore portion 56 of progressively decreasing diameter. The first bore portion 52 joins the second bore portion 54 to form a first radial shoulder 57 and the second bore portion 54 joins the third bore portion 56 to form a second radial shoulder 59. Bore 52, which is the first, or inner, bore (that is, the bore opening into the pillow block housing 16) has two seal units 58, 60 tightly received therein in spaced relation to define with the shaft 36 an annular chamber 62 between the seals.

The outer seal unit 60 has a casing 63 with angularly spaced dimples 61 which abut against the radial shoulder 57 formed where bore 52 connects to the smaller bore 54. The seal unit 60, bore 54, and the inner wall, or shoulder, 59 of a circular flange 66 on the housing defines, with shaft 36, another annular chamber 68. The lip of flange 66 constitutes the bore 56 and defines, with shaft 36, an annular gap 70.

The inner seal unit 58 has a resilient lip seal 70 mounted on a rim 72. The seal 70 is confined within a casing 73 but has a lip portion 74 which extends radially inwardly from the casing for contact with the shaft 36. The outer seal unit 60 has a plurality of discs 76 which extend radially inwardly to the shaft, a casing 78, and a retaining washer 80 which is received in the casing to hold the discs therein. The disc seal unit 60 is described in more detail in U.S. Pat. No. 3,460,242.

The annular chambers 62 and 68 constitute grease chambers in the seal carrier housing. A grease fitting 90 is mounted in an opening, or passage, 92 which has two branch passages extending therefrom, respectively, to the two grease chambers 62 and 68. The first branch passage is defined by an axial passage 94 which extends from the inner end of passage 92 to the annular grease chamber 62. The other branch passage 96 is defined by the space between the outer side of seal casing 78 and the shoulder 57. The width of passage 96 is established by the dimples 61 which abut against shoulder 57.

The annular chamber 62 has a discharge passage 98 leading therefrom. The passage 98 has an axial portion 98a and a sloping portion 98b. At least one portion (such as 98b) of passage 98 is smaller than the grease inlet passage 94 so that the restriction to grease flow from the chamber 62 is greater than the restriction to grease flow into the chamber 62. The annular gap 70 constitutes a discharge passage 70 from annular chamber 68, and passage 70 is smaller than the inlet passage 96. The dimples 61 define the width of inlet passage 96 to assure less restriction to flow than the restriction to flow produced by the discharge gap 70.

It will be noted that two annular chambers 62 and 68 have been provided, each having an inlet passage and a discharge opening. Grease, from a high pressure gun or other source, tends to create a sudden increase in pressure in a grease chamber. In each chamber, 62, 68, the discharge opening permits a limited escape of high pressure grease, thereby preventing an excessive pressure buildup with the resulting damage to the seals. However, it is important to note that the restriction to flow out of each chamber is greater than the restriction to flow into each chamber, so that a full circumferential flow of grease through the 360° of each annular chamber is assured.

After chamber 62 is full, and grease continues to enter the chamber at a greater rate than it can be discharged through opening 98, the grease will creep axially forwardly (to the left as viewed in FIG. 3) and rearwardly (to the right as viewed in FIG. 3) to penetrate between the seals and the shaft, thereby reducing the wear of the seals caused by the rotating shaft.

After chamber 68 is full of grease, the entry of grease into the chamber will force grease rearwardly between the disc seal and the shaft and forwardly through gap 70. The forceful discharge of grease through gap 70 will flush dirt and abrasives, which may have previously penetrated the gap 70, out of the gap 70.

Instead of the dimples 61, radially oriented spacer strips 99 may be secured to the casing 63 of seal unit 60. The spacer strips 99, when they abut shoulder 57, will define the width of branch inlet passage 96 and hence, will define the extent of the restriction to flow through this passage.

Although the best mode contemplated for carrying out the present invention has been herein shown and described, it will be apparent that modification and variation may be made without departing from what is regarded to be the subject matter of the invention.

What is claimed is:

1. A seal carrier for sealing an opening surrounding a shaft, said seal carrier having a housing to encircle said shaft, and fill said opening, said housing having a bore extending therethrough comprising a first, a second, and a third bore portion of progressively decreasing diameter, said bore portions connected to form a first shoulder between said first and second bore portions and to form a second shoulder between said second and third bore portions, a pair of seal units mounted in said first bore portion in spaced apart relation to form a first annular grease chamber therebetween, one of said seal units spaced from said second shoulder to form a second annular grease chamber therebetween, a grease inlet opening, means defining a first branch grease passage from said grease inlet opening to said first chamber, protuberances on one of said seals for engagement with said first shoulder to form a branch grease passage between said one seal and said first shoulder leading from said grease inlet opening to said second annular chamber.

2. The seal carrier of claim 1 wherein a gap is defined between said shaft and said third bore portion to define a discharge opening from said second annular chamber.

3. The seal carrier of claim 2 including a discharge opening in communication with said first annular grease chamber.

4. The seal carrier of claim 3 wherein the restriction to grease flow from said discharge openings is greater than the restriction to flow of said inlet passages whereby grease introduced through said grease inlet opening will be distributed completely around said grease chambers.

5. The seal carrier of claim 1 wherein said one seal unit includes a seal case and wherein said protuberances on said one seal unit are angularly spaced dimples on the seal case.

6. The seal carrier of claim 1 wherein said one seal unit includes a seal case and wherein said protuberances on said one seal unit are angularly spaced spacer strips on the seal case of said unit.

7. A seal carrier for receipt in a housing to protect bearings mounted in the housing inwardly of said seal carrier, said seal carrier having an inner and outer seal therein spaced apart to define therebetween a first annular grease chamber in the carrier surrounding the shaft, an outer wall in said carrier defining a circular opening for said shaft, the outer seal spaced from said wall to define a second annular grease chamber in the carrier surrounding said shaft, and means to supply grease under pressure separately to said first annular grease chamber for penetration between the seals and the shaft on either side of said first chamber and to said second annular grease chamber for discharge through the gap between the outer wall and the shaft to flush dirt and abrasives from the seal carrier.

8. The seal carrier of claim 7 including a discharge passage from said first grease chamber.

9. The seal carrier of claim 7 wherein said means to receive grease under pressure includes a grease fitting and a first passage leading to said first grease chamber and a second passage leading to said second grease chamber.

10. A seal carrier for receipt in a housing to protect bearings mounted in the housing inwardly of said seal carrier, said seal carrier having an inner and outer seal therein spaced apart to define therebetween a first annular grease chamber in the carrier surrounding the shaft, an outer wall in said carrier defining a circular opening for said shaft, the outer seal spaced from said wall to define a second annular grease chamber in the carrier surrounding said shaft, and means including a first passage to supply grease under pressure directly to said first annular grease chamber for penetration between the seals and the shaft on either side of said first chamber and including a second passage to supply grease under pressure directly to said second annular grease chamber for discharge through the gap between the outer wall and the shaft to flush dirt and abrasives from the seal carrier, means defining a discharge passage from said first grease chamber, said discharge passage from the first grease chamber and the discharge passage from the second grease chamber defined by the gap between the wall and the shaft defining greater restrictions to flow than said first and second passages, respectiively.

11. A seal carrier for sealing an opening surrounding a shaft, said seal carrier having a housing to encircle said shaft and fill said opening, said housing having a bore extending therethrough comprising at least a first and a second bore portion of progressively decreasing diameter, said bore portions connected to form a shoulder between said first and second bore portions, a pair of seal units mounted in said first bore portion in spaced apart relation to form a first annular grease chamber therebetween, one of said seal units spaced from said shoulder to form a second annular grease chamber, a grease inlet opening, means defining a first branch grease passage from said grease inlet opening to said first chamber, means to space one of said seals from said shoulder to form a branch grease passage between said one seal and said shoulder leading from said grease inlet opening to said second annular chamber.

* * * * *

UNITED STATES PATENT OFFICE
CERTIFICATE OF CORRECTION

PATENT NO. : 3,869,131
DATED : March 4, 1975
INVENTOR(S) : William J. Derner

It is certified that error appears in the above-identified patent and that said Letters Patent are hereby corrected as shown below:

Col. 4, line 25, after "protect" insert --shaft-receiving--
             line 43, delete "receive" and insert therefor --supply--;
             line 47, after "protect" insert --shaft-receiving--

Signed and Sealed this tenth Day of February 1976

[SEAL]

Attest:

RUTH C. MASON
*Attesting Officer*

C. MARSHALL DANN
*Commissioner of Patents and Trademarks*